(12) United States Patent
Shetty

(10) Patent No.: US 6,772,345 B1
(45) Date of Patent: Aug. 3, 2004

(54) PROTOCOL-LEVEL MALWARE SCANNER

(75) Inventor: Satish Shetty, Beaverton, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 167 days.

(21) Appl. No.: 10/067,886

(22) Filed: Feb. 8, 2002

(51) Int. Cl.$^7$ ................................. H04L 9/00
(52) U.S. Cl. ................ 713/200; 713/151; 713/153; 713/154; 714/15; 370/39
(58) Field of Search ................ 713/151, 153, 713/154, 200; 714/15; 370/39

(56) References Cited

U.S. PATENT DOCUMENTS

| | | | |
|---|---|---|---|
| 5,319,776 A | 6/1994 | Hile et al. | 395/575 |
| 5,559,883 A | 9/1996 | Williams | 380/4 |
| 5,606,668 A | 2/1997 | Shwed | 395/200.11 |
| 5,623,600 A | 4/1997 | Ji et al. | 395/187.01 |
| 5,835,726 A | 11/1998 | Shwed et al. | 395/200.59 |
| 5,884,025 A | 3/1999 | Baehr et al. | 395/187.01 |
| 5,889,943 A | 3/1999 | Ji et al. | 395/187.01 |
| 5,935,245 A | 8/1999 | Sherer | 713/200 |
| 5,960,170 A | 9/1999 | Chen et al. | 395/183.14 |
| 6,131,163 A | 10/2000 | Wiegel | 713/201 |

OTHER PUBLICATIONS

Netscape Communications: "Protocol Plug–in Programming Guide," Published 1999 <http://developer.netscape.com/docs/manuals>.*
Netscape Communications: "Messaging Server Administrators Guide," Published 1999 <http://developer.netscape.com/docs/manuals>.*

* cited by examiner

*Primary Examiner*—Gregory Morse
*Assistant Examiner*—Paul Callahan
(74) *Attorney, Agent, or Firm*—Christopher J. Hamaty; Swidler Berlin Shereff Friedman, LLP

(57) ABSTRACT

A method, system, and computer program product for malware scanning of data that is being transferred or downloaded to a computer system that is performed at the protocol level, and is capable of blocking the spread of malwares that may not be blocked by operating system level scanning. A method of detecting a malware comprises the steps of: a) receiving a data stream, b) scanning the data stream at a protocol level to detect a malware, c) removing the detected malware from the data stream, and d) transmitting the data stream without the malware.

19 Claims, 4 Drawing Sheets

PROTOCOL-LEVEL MALWARE SCANNER

FIELD OF THE INVENTION

The present invention relates to a method, system, and computer program product for detecting computer malwares that scans network traffic at the protocol level.

BACKGROUND OF THE INVENTION

As the popularity of the Internet has grown, the proliferation of computer malware has become more common. A typical computer malware is a program or piece of code that is loaded onto a computer and/or performs some undesired actions on a computer without the knowledge or consent of the computer operator. The most widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers.

Along with the proliferation of computer viruses and other malware has come a proliferation of software to detect and remove such viruses and other malware. This software is generically known as anti-virus software or programs. In order to detect a virus or other malicious program, an anti-virus program typically scans files stored on disk in a computer system and/or data that is being transferred or downloaded to a computer system, or that is being accessed on a computer system, and compares the data being scanned with profiles that identify various kinds of malware. The anti-virus program may then take corrective action, such as notifying a user or administrator of the computer system of the virus, isolating the file or data, deleting the file or data, etc.

Typically, anti-virus programs scan data that is being transferred or downloaded to a computer system for computer malwares at the operating system level. In other words, the data is scanned after the data is output from the communications protocols and drivers and is available to application programs running on the computer system. While this level of scanning is adequate to detect many of the malwares in existence, operating system level scanning may not successfully block the spread of all malwares. For example, the well-known "Nimbda" and "CodeRed" malwares may have already replicated themselves by the time they are detected by an operating system level scan.

A need arises for a technique by which malware scanning of data that is being transferred or downloaded to a computer system can be performed so as to block the spread of malwares that may not be blocked by operating system level scanning.

SUMMARY OF THE INVENTION

The present invention is a method, system, and computer program product for malware scanning of data that is being transferred or downloaded to a computer system that is performed at the protocol level. The present invention is capable of blocking the spread of malwares that may not be blocked by operating system level scanning. In one embodiment of the present invention, a method of detecting a malware comprises the steps of: a) receiving a data stream, b) scanning the data stream at a protocol level to detect a malware, c) removing the detected malware from the data stream, and d) transmitting the data stream without the malware. The data stream may be received from a communications network. The communications network may be the Internet. The protocol level may include a protocol including at least one of: Post Office Protocol, HyperText Transfer Protocol, File Transfer Protocol, Trivial File Transfer Protocol, Simple Mail Transfer Protocol, Internet Message Access Protocol, or Network News Transfer Protocol.

In one aspect of the present invention, steps a)–d) are performed on a workstation computer system. The receiving step may comprise the step of receiving a data stream from a local area network or a wide area network connected to the workstation computer system. The transmitting step may comprise the step of transmitting the data stream without the malware to an operating system and/or application programs running on the workstation computer system. The protocol level may includes a protocol including at least one of Post Office Protocol, HyperText Transfer Protocol, File Transfer Protocol, Trivial File Transfer Protocol, Simple Mail Transfer Protocol, Internet Message Access Protocol, or Network News Transfer Protocol.

In one aspect of the present invention, steps a)–d) are performed on a gateway computer system. The receiving step may comprise the step of receiving a data stream from a network to the gateway computer system or from a network via a router/firewall connected to the gateway computer system. The transmitting step may comprise the step of transmitting the data stream without the malware to a computer system via a local area network or a wide area network connected to the gateway computer system. The protocol level may include a protocol including at least one of Post Office Protocol, HyperText Transfer Protocol, File Transfer Protocol, Trivial File Transfer Protocol, Simple Mail Transfer Protocol, Internet Message Access Protocol, or Network News Transfer Protocol.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE DRAWINGS

A typical computer malware is a program or piece of code that is loaded onto a computer and/or performs some undesired actions on a computer without the knowledge or consent of the computer operator. Types of malware include computer viruses, Trojan horse programs, and other content. One widespread, well-known and dangerous type of computer malware are computer viruses, that is, programs or pieces of code that replicate themselves and load themselves onto other connected computers. Once the virus has been loaded onto the computer, it is activated and may proliferate further and/or damage the computer or other computers. A particular type of computer virus is the computer worm, which is a program or code that replicates itself over a computer network and may performs malicious actions, such as using up the computer's resources and possibly shutting the system down. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer. Although terms such as virus or anti-virus may be used for clarity, such terms are used only as example of malwares and the present invention contemplates any and all types of malware, including, but not limited to computer viruses, computer worms, Trojan horse programs.

Figure 1:
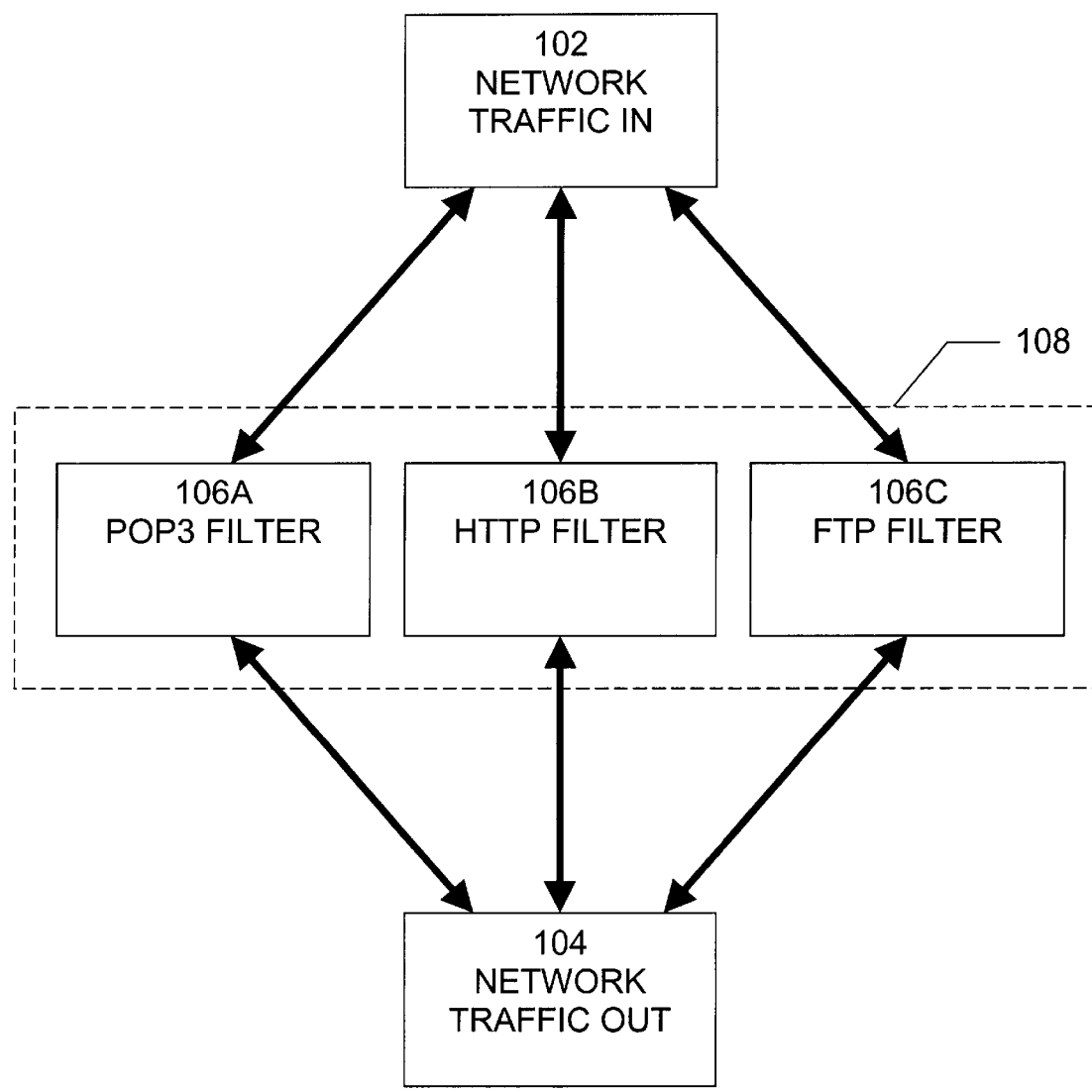
FIG. 1 is an exemplary data flow diagram of processing performed by the present invention.

An exemplary data flow diagram of processing performed by the present invention is shown in FIG. 1. As shown in FIG. 1, incoming network traffic 102 and outgoing network traffic 104 are filtered by one or more protocol filters, such as filters 106A–C. The protocol filters scan the traffic data stream for malwares. If a protocol filter detects a malware in a data stream, the filter takes corrective action, for example, by filtering the malware out of the data stream. The protocol filters scan the datastream at the protocol level, rather than the operating system level. Filter functionality is required for each protocol that is to be supported. For example, Post Office Protocol 3 (POP3) filter 106A scans the POP3 data stream, HyperText Transfer Protocol (HTTP) filter 106B scans the HTTP data stream, and File Transfer Protocol (FTP) filter 106C scans the FTP data stream. POP3 is a protocol used to retrieve e-mail from a mail server, HTTP is the underlying protocol used by the World Wide Web, and FTP is a protocol used on the Internet for sending files. The protocol filters shown in FIG. 1 merely illustrate examples of protocols that may be supported. For example, other protocols that may be supported include Trivial File Transfer Protocol (TFTP), a simple form of FTP, Simple Mail Transfer Protocol (SMTP), a protocol for sending e-mail messages between servers, Internet Message Access Protocol (IMAP), a protocol for retrieving e-mail messages, Network News Transfer Protocol (NNTP), the protocol used to post, distribute, and retrieve USENET messages, etc. These listed protocols are examples only. The present invention contemplates any and all past, current, and future protocols that may be used.

Together, protocol filters 106A–C make up protocol scanner 108. In FIG. 1, protocol filters for each protocol are shown separately. However, one of skill in the art would recognize that protocol filters may be implemented separately or in any desired combination.

Incoming network traffic 102 may include data received from any connected network. Such networks may include any standard local area network (LAN) or wide area network (WAN), such as Ethernet, Token Ring, the Internet, or a private or proprietary LAN/WAN. Incoming network traffic is scanned by the protocol scanner 108 and malware-free data is transmitted to the consumers of the data. In addition, outgoing network traffic may be scanned by protocol scanner 108 and malware-free data transmitted over the network.

Preferably, protocol scanner 108 will be capable of performing a number of functions:

Scanning for computer malwares, such as viruses, Trojans and worms in the entire network TCP/IP protocol like HTTP, FTP, SMTP/POP3, etc.

Blocking an IP address or set of IP address: This means this IP address or set of blocked IP address will not able to send or receive any data from the protected corporation network.

Blocking emails (stop network spamming): By scanning POP3 and SMTP protocols, protocol scanner 108 will be able to block emails from specified addresses.

Blocking ports (works as firewall): the system administrator can block certain ports in the network by configuring protocol scanner 108 to ignore the traffic on the specified ports and close any in-coming/out-going connections on these ports. This provides firewall functionality.

Blocking URLs (Websites): the system administrator can block certain websites and Uniform Resource Locators (URLs) by configuring those URLs in protocol scanner 108. HTTP protocol filter 106B of protocol scanner 108 will filter for those URLs and any access to those URLs will be denied.

Figure 2:
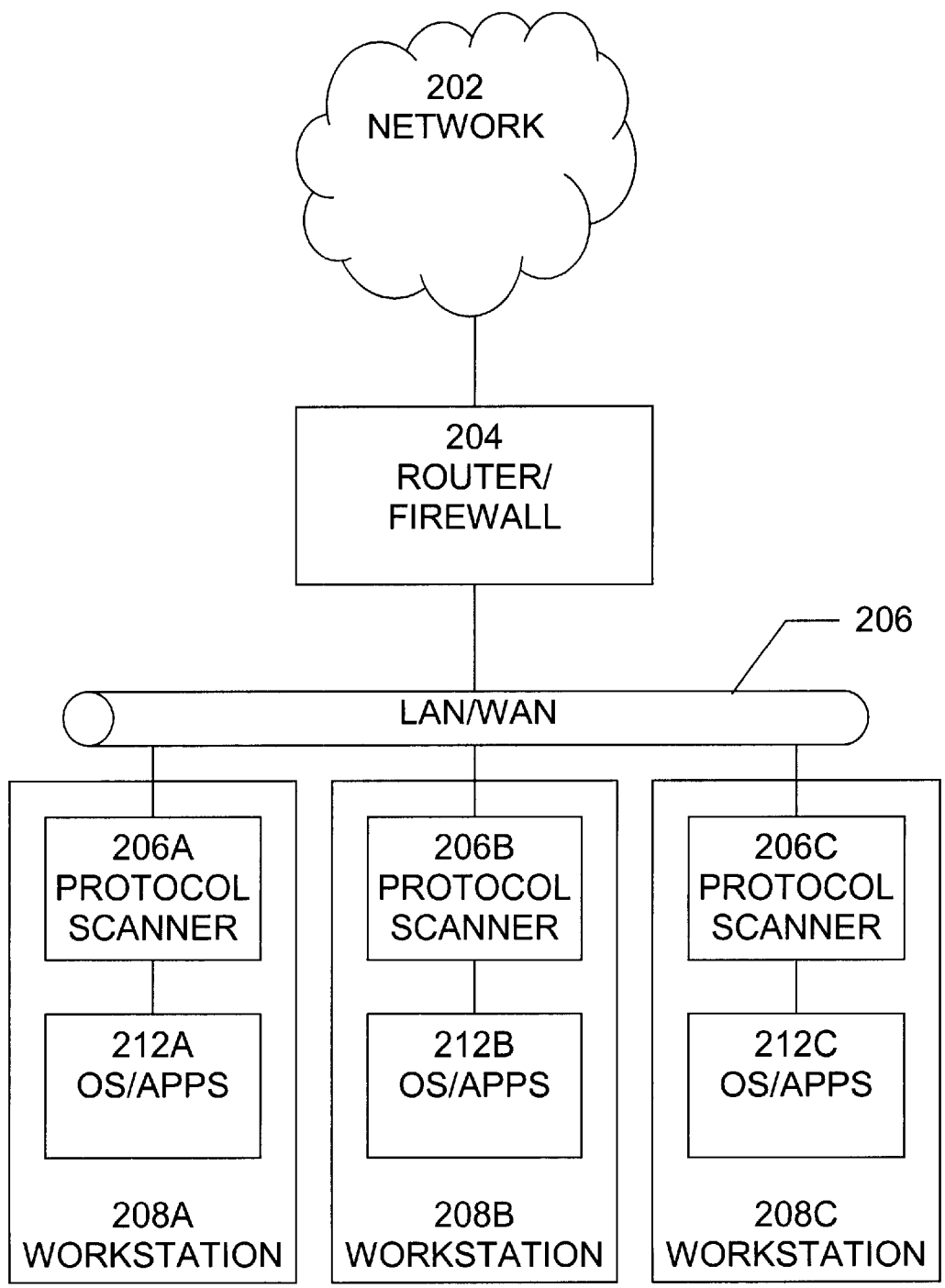
FIG. 2 is a block diagram of an exemplary overall architecture of a desktop level protocol scanner embodiment.

An exemplary illustration of an overall architecture of a desktop level protocol scanner embodiment is shown in FIG. 2. The desktop level protocol scanner embodiment takes care of scanning for malicious codes in single computer where it is transparent to other users on the network. Scanning performance will be better in this case because you scan the data packets at the client level, which will not clog the gateway device. This embodiment is also useful in the situation where a single computer connects to the Internet using a dial-up modem. In this situation, the desktop level scanner can protect this individual computer from virus threats.

As shown in FIG. 2, each workstation computer has its copy of the protocol scanner instance running. There is no scanning device on the gateway and the Internet traffic comes all the way to the overall architecture computer, where the protocol scanner scans for malwares and then forwards the scanned data to workstation computer applications.

The desktop level protocol scanner embodiment provides improved network data transfer and scanning performance with reduced network congestion. In addition, the workstations do not need to modify their network settings to configure the desktop level protocol scanner. However, in the desktop level protocol scanner embodiment, the protocol scanner must be installed and administered on all workstation computers. In addition, since the malware scanning and removal is performed by the workstations, the malware data has already entered the network before arriving at the protocol scanner.

Network traffic is communicated with network 202 via router/firewall 204. Router/firewall 204 is connected to LAN/WAN 206, which is connected to a plurality of workstations, such as workstations 208A–C. Workstations 208A–C include protocol scanners, such as protocol scanners 210A–C, and operating systems (OS) and applications, such as operating systems and applications 212A–C.

Network 202 is typically the Internet, but may include any standard local area network (LAN) or wide area network (WAN), such as Ethernet or Token Ring, or a private or proprietary LAN/WAN. LAN/WAN 206 is typically a private network that may include any standard local area network (LAN) or wide area network (WAN) technology, such as Ethernet or Token Ring, or any proprietary network technology.

Router/firewall 204 may include only router functionality, only firewall functionality, or both router and firewall functionality. A router is a device that connects a number of networks and communicates data traffic among the connected networks. Routers typically use headers and a forwarding table to determine where packets go. Typically, very little filtering of data is done through routers. Routers do not care about the type of data they handle. A firewall is a system designed to prevent unauthorized access to or from a private network. Firewalls can be implemented in both hardware and software, or a combination of both. Firewalls are frequently used to prevent unauthorized Internet users from accessing private networks connected to the Internet, especially intranets, which may be implemented, for example, on LAN/WAN 206. All messages entering or leaving the intranet pass through the firewall, which examines each message and blocks those that do not meet the specified security criteria.

There are several types of firewall techniques. A packet filter looks at each packet entering or leaving the network and accepts or rejects it based on user-defined rules. Packet filtering is fairly effective and transparent to users, but it is difficult to configure. In addition, it is susceptible to IP spoofing. An application gateway applies security mechanisms to specific applications, such as FTP and Telnet servers. This is very effective, but can impose a performance degradation. A circuit-level gateway applies security mechanisms when a TCP or UDP connection is established. Once the connection has been made, packets can flow between the hosts without further checking. A proxy server intercepts all messages entering and leaving the network. The proxy server effectively hides the true network addresses.

In practice, many firewalls use two or more of these techniques in concert. A firewall is considered a first line of defense in protecting private information. For greater security, data can be encrypted.

Workstations 208A–C are typically general-purpose computer systems operated by individual users, such as personal computers or proprietary workstation computers. Workstations 208A–C are connected to router/firewall 204 via LAN/WAN 206. Workstations 208A–C include protocol scanners, such as protocol scanners 210A–C, and operating systems (OS) and applications, such as operating systems and applications 212A–C. Each protocol scanner, such as protocol scanner 206A, includes at least one protocol filter, such as those shown in FIG. 1. Incoming network traffic and outgoing network traffic are filtered by the protocol filters included in protocol scanner 206A. The protocol filters scan the traffic data stream for malwares. If a protocol filter detects a malware in a data stream, the filter takes corrective action, for example, by filtering the malware out of the data stream. The protocol filters scan the datastream at the protocol level, rather than the operating system level. Filter functionality is required for each protocol that is to be supported.

Figure 3:
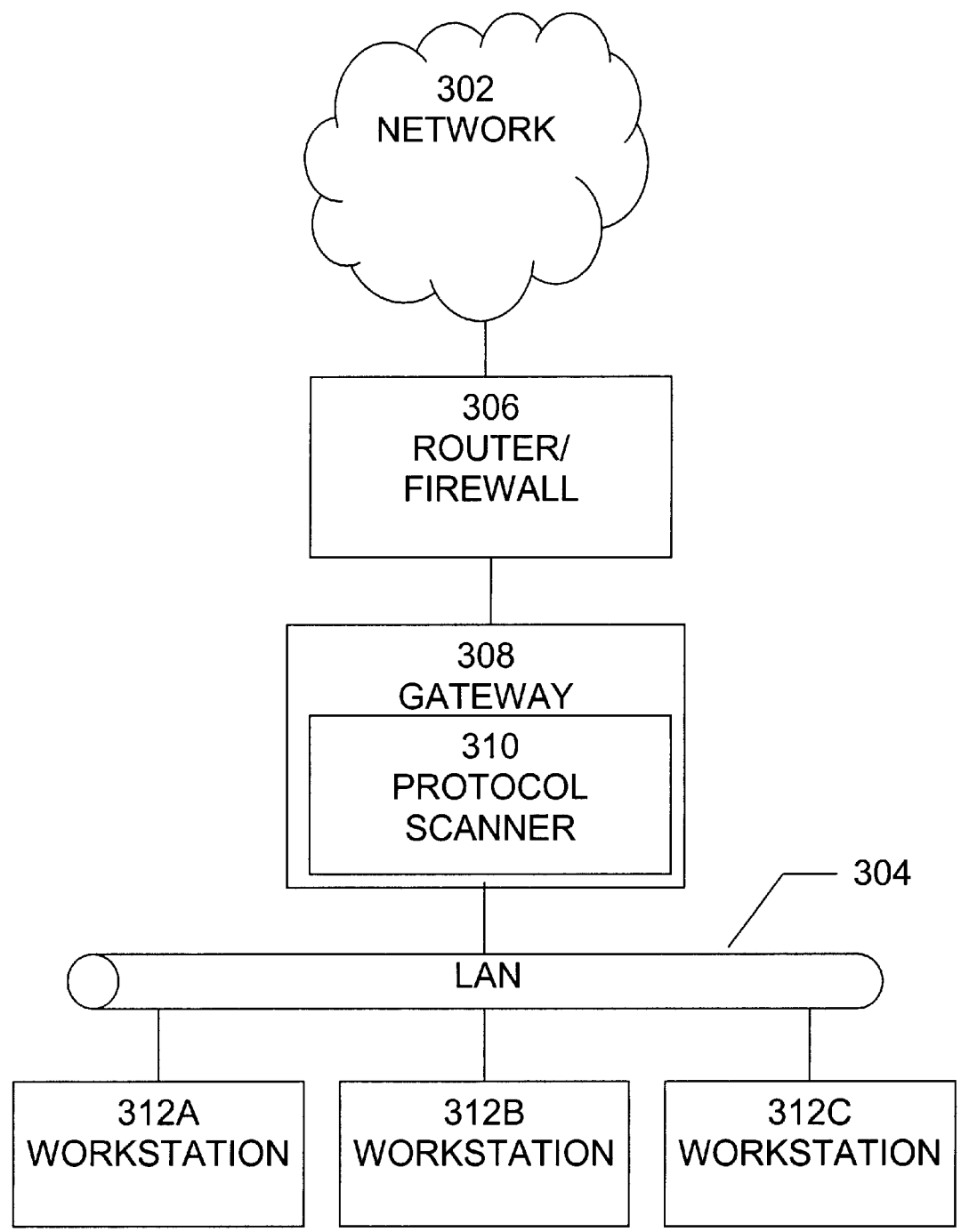
FIG. 3 is a block diagram of exemplary overall architecture of a gateway level protocol scanner embodiment

An exemplary illustration of an overall architecture of a gateway level protocol scanner embodiment is shown in FIG. 3. In this embodiment, a gateway performs protocol scanning of all traffic communicated between network 302 and LAN/WAN 304. Gateway level scanning gives better security in terms of malicious attacks because all the data packets are scanned before they enter into the local network. In addition, network administration is simplified because all protocol scanning for the network is controlled at a single network node. However, since all network traffic is scanned at a single node, performance may be degraded. In addition, the workstation computers must be properly configured to operate with the gateway.

Network traffic is communicated with network 302 via router/firewall 306. Router/firewall 306 is connected to gateway 308, which includes protocol scanner 310. Gateway 308 is connected to LAN/WAN 304, which is connected to a plurality of workstations, such as workstations 312A–C.

Network 302 is typically the Internet, but may include any standard local area network (LAN) or wide area network (WAN), such as Ethernet or Token Ring, or a private or proprietary LAN/WAN. LAN/WAN 304 is typically a private network that may include any standard local area network (LAN) or wide area network (WAN) technology, such as Ethernet or Token Ring, or any proprietary network technology.

Router/firewall 306 may include only router functionality, only firewall functionality, or both router and firewall functionality.

Workstations 312A–C are typically general-purpose computer systems operated by individual users, such as personal computers or proprietary workstation computers. Workstations 312A–C are connected to gateway 308 via LAN/WAN 206. Gateway 308 includes protocol scanner 310. Protocol scanner 310 includes at least one protocol filter, such as those shown in FIG. 1. Incoming network traffic and outgoing network traffic are filtered by the protocol filters included in protocol scanner 310. The protocol filters scan the traffic data stream for malwares. If a protocol filter detects a malware in a data stream, the filter takes corrective action, for example, by filtering the malware out of the data stream. The protocol filters scan the datastream at the protocol level, rather than the operating system level. Filter functionality is required for each protocol that is to be supported.

Figure 4:
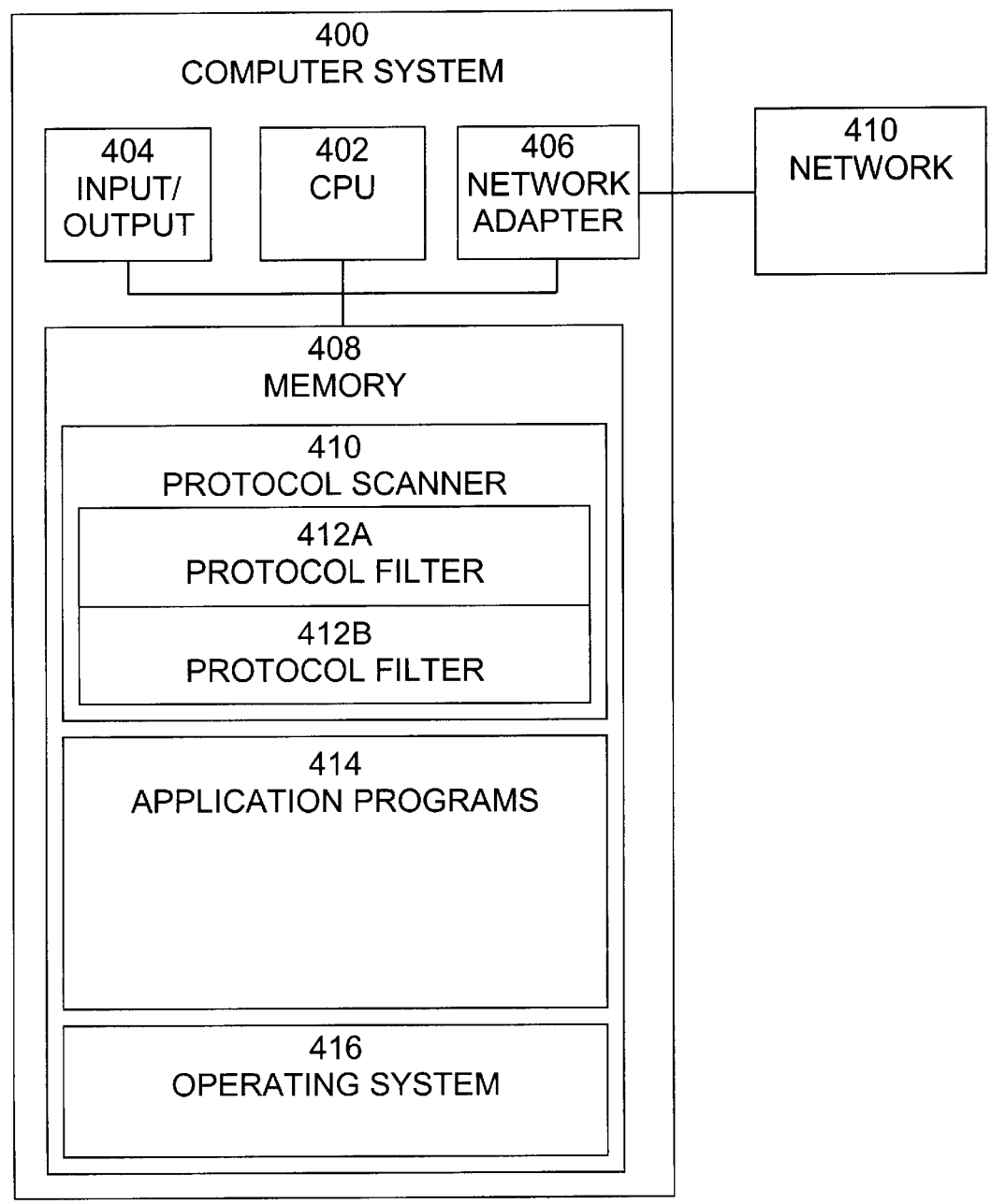
FIG. 4 is a block diagram of an exemplary computer system in which the present invention may be implemented.

A block diagram of an exemplary computer system 400, in which the present invention may be implemented, is shown in FIG. 4. Depending upon the type of computer system and its connections with other computer systems and networks, computer system 400 may implement either desktop level protocol scanning or gateway level protocol scanning. Computer system 400 is typically a programmed general-purpose computer system, such as a personal computer, workstation, server system, and minicomputer or mainframe computer.

Computer system 400 includes processor (CPU) 402, input/output circuitry 404, network adapter 406, and memory 408. CPU 402 executes program instructions in order to carry out the functions of the present invention. Typically, CPU 402 is a microprocessor, such as an INTEL PENTIUM® processor, but may also be a minicomputer or mainframe computer processor. Although in the example shown in FIG. 4, computer system 400 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 400 is implemented on a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, etc., output devices, such as video adapters, monitors, printers, etc., and input/output devices, such as, modems, etc. Network adapter 406 interfaces computer system 400 with network 410. Network 410 may be any standard local area network (LAN) or wide area network (WAN), such as Ethernet, Token Ring, the Internet, or a private or proprietary LAN/WAN.

If computer system 400 is implementing desktop level protocol scanning, computer system 400 is typically a workstation or personal computer and network 410 is a LAN and/or WAN. If computer system 400 is implementing gateway level protocol scanning, computer system 400 is typically a server computer system and network 410 may include a LAN and/or WAN, as well as a network or direct connection to a router/firewall system.

Memory 408 stores program instructions that are executed by, and data that are used and process ed by, CPU 402 to perform the functions of the present invention. Memory 408 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 408 includes protocol scanner 410, which includes at least one protocol filter, such as protocol filters 412A and 412B, application programs 414, and operating system 412. Protocol scanner 410 scans for network traffic for malwares and then forwards the scanned data to workstation computers and/or workstation computer applications. Each protocol filter, such as protocol filter 412A, scans the traffic data stream for malwares. If a protocol filter detects a malware in a data stream, the filter takes corrective action, for example, by filtering the malware out of the data stream. The protocol filters scan the datastream at the protocol level, rather than the operating system level. Filter functionality is required for each protocol that is to be supported. Application programs 410 are other programs that are running on computer system 400. If computer system 400 is implementing desktop level protocol scanning, application programs 410 are typically programs that interface with the computer user or perform services for the computer user. If computer system 400 is implementing gateway level protocol scanning, application programs 414 are typically programs that perform network or administrative functions. Operating system 412 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of detecting a malware comprising the steps of:
   a) receiving a data stream;
   b) scanning the data stream at a protocol level to detect a malware including viruses;
   c) removing the detected malware from the data stream;
   d) transmitting the data stream without the malware;
   e) determining an IP address and a port associated with the detected malware, wherein the IP address and the port are blocked from being able to send any data to a protected network, and the IP address and the port are blocked from being able to receive any data from the protected network; and
   f) scanning email messages at a protocol level, each email message transmitted by one of a plurality of protocols; wherein:
      i) a HyperText Transfer Protocol (HTTP) filter is utilized for scanning an HTTP data stream for malware,
      ii) a File Transfer Protocol (FTP) filter is utilized for scanning an FTP data stream for malware,
      iii) a Simple Mail Transfer Protocol (SMTP) filter is utilized for scanning an SMTP data stream for malware,
      iv) an Internet Message Access Protocol (IMAP) filter is utilized for scanning an IMAP data stream for malware,
      v) a Post Office Protocol filter is utilized for scanning a Post Office Protocol data stream for malware,
      vi) a Trivial File Transfer Protocol filter is utilized for scanning a Trivial File Transfer Protocol data stream for malware, and
      vii) a Network News Transfer Protocol filter is utilized for scanning a Network News Transfer Protocol data stream for malware.

2. The method of claim 1, wherein the data stream is received from a communications network.

3. The method of claim 2, wherein the communications network is the Internet.

4. The method of claim 1, wherein steps a)–f) are performed on a workstation computer system.

5. The method of claim 4, wherein the receiving step comprises the step of:
   receiving a data stream from a local area network or a wide area network connected to the workstation computer system.

6. The method of claim 5, wherein the transmitting step comprises the step of:
   transmitting the data stream without the malware to an operating system and/or application programs running on the workstation computer system.

7. The method of claim 1, wherein steps a)–f) are performed on a gateway computer system.

8. The method of claim 7, wherein the receiving step comprises the step of:
   receiving a data stream from a network to the gateway computer system or from a network via a router/firewall connected to the gateway computer system.

9. The method of claim 8, wherein the transmitting step comprises the step of:
   transmitting the data stream without the malware to a computer system via a local area network or a wide area network connected to the gateway computer system.

10. A system for detecting a malware comprising:
   a processor operable to execute computer program instructions;
   a memory operable to store computer program instructions executable by the processor; and
   computer program instructions stored in the memory and executable to perform the steps of:

a) receiving a data stream;

b) scanning the data stream at a protocol level to detect a malware including viruses;

c) removing the detected malware from the data stream;

d) transmitting the data stream without the malware;

e) determining an IP address and a port associated with the detected malware, wherein the IP address and the port are blocked from being able to send any data to a protected network, and the IP address and the port are blocked from being able to receive any data from the protected network; and f) scanning email messages at a protocol level, each email message transmitted by one of a plurality of protocols; wherein:

i) a HyperText Transfer Protocol (HTTP) filter is utilized for scanning an HTTP data stream for malware, ii) a File Transfer Protocol (FTP) filter is utilized for scanning an FTP data stream for malware, iii) a Simple Mail Transfer Protocol (SMTP) filter is utilized for scanning an SMTP data stream for malware, iv) an Internet Message Access Protocol (IMAP) filter is utilized for scanning an IMAP data stream for malware, v) a Post Office Protocol filter is utilized for scanning a Post Office Protocol data stream for malware, vi) a Trivial File Transfer Protocol filter is utilized for scanning a Trivial File Transfer Protocol data stream for malware, and vii) a Network News Transfer Protocol filter is utilized for scanning a Network News Transfer Protocol data stream for malware.

11. The system of claim 10, wherein the data stream is received from a communications network.

12. The system of claim 11, wherein the communications network is the Internet.

13. The system of claim 10, wherein steps a)–f) are performed on a workstation computer system.

14. The system of claim 13, wherein the receiving step comprises the step of:

receiving a data stream from a local area network or a wide area network connected to the workstation computer system.

15. The system of claim 14, wherein the transmitting step comprises the step of:

transmitting the data stream without the malware to an operating system and/or application programs running on the workstation computer system.

16. The system of claim 10, wherein steps a)–f) are performed on a gateway computer system.

17. The system of claim 16, wherein the receiving step comprises the step of:

receiving a data stream from a network to the gateway computer system or from a network via a router/firewall connected to the gateway computer system.

18. The system of claim 17, wherein the transmitting step comprises the step of:

transmitting the data stream without the malware to a computer system via a local area network or a wide area network connected to the gateway computer system.

19. A computer program product for detecting a malware comprising:

a computer readable medium;

computer program instructions, recorded on the computer readable medium, executable by a processor, for performing the steps of:

a) receiving a data stream;

b) scanning the data stream at a protocol level to detect a malware including viruses;

c) removing the detected malware from the data stream;

d) transmitting the data stream without the malware;

e) blocking an IP address and a port associated with the detected malware, wherein the IP address and the port are blocked from being able to send any data to a protected network, and the IP address and the port are blocked from being able to receive any data from the protected network; and f) scanning email messages at a protocol level, each email message transmitted by one of a plurality of protocols; wherein:

i) a HyperText Transfer Protocol (HTTP) filter is utilized for scanning an HTTP data stream for malware, ii) a File Transfer Protocol (FTP) filter is utilized for scanning an FTP data stream for malware, iii) a Simple Mail Transfer Protocol (SMTP) filter is utilized for scanning an SMTP data stream for malware, iv) an Internet Message Access Protocol (IMAP) filter is utilized for scanning an IMAP data stream for malware, v) a Post Office Protocol filter is utilized for scanning a Post Office Protocol data stream for malware, vi) a Trivial File Transfer Protocol filter is utilized for scanning a Trivial File Transfer Protocol data stream for malware, and vii) a Network News Transfer Protocol filter is utilized for scanning a Network News Transfer Protocol data stream for malware;

wherein the data stream is received from the Internet;

wherein steps a)–f) are performed on a gateway computer system;

wherein the receiving step comprises the step of receiving a data stream from a network to the gateway computer system or from a network via a router/firewall connected to the gateway computer system;

wherein uniform resource locators (URLs) are blocked;

wherein packet filtering is performed to accept and reject packets based on user-defined rules.

* * * * *